(No Model.)
G. C. GOODYEAR.
ROTARY CUTTER HEAD.
No. 520,046. Patented May 22, 1894.
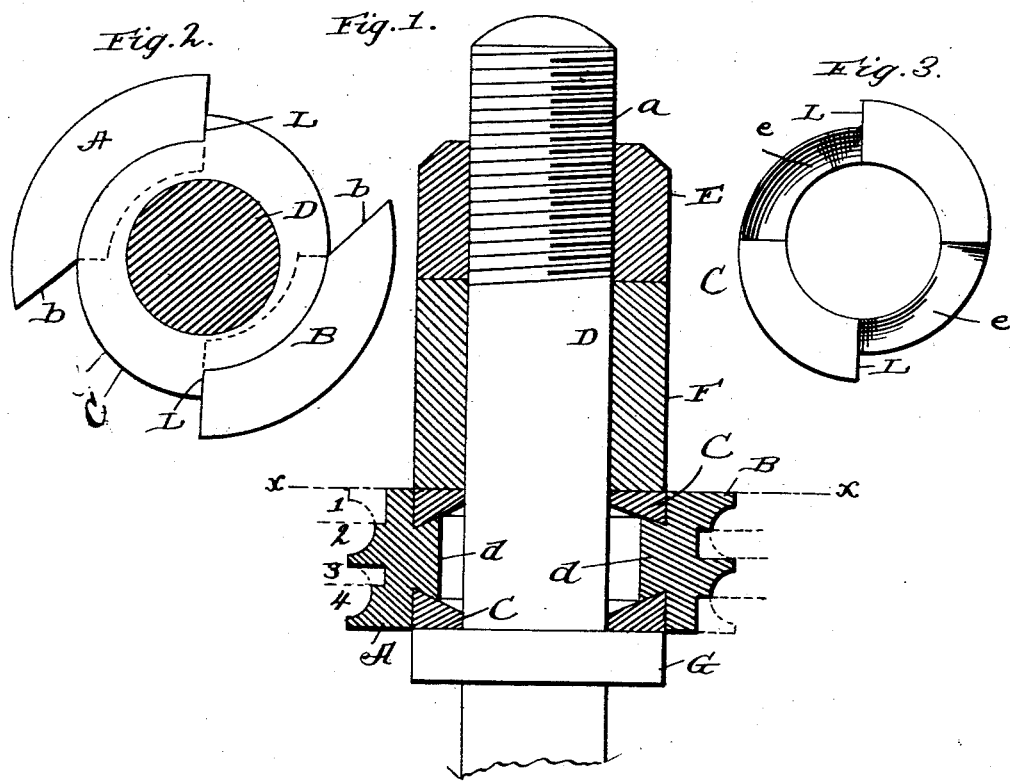
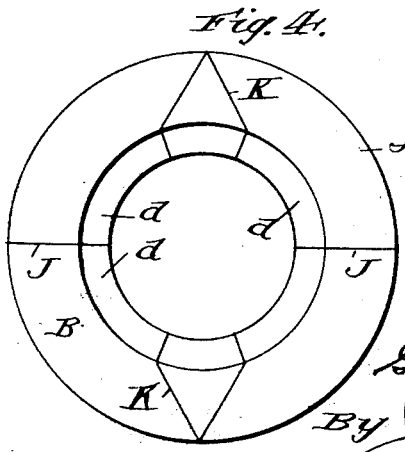
Witnesses:
Inventor
G. C. Goodyear
By James J. Shuby
Attorney

UNITED STATES PATENT OFFICE.

GEORGE C. GOODYEAR, OF FLINT, MICHIGAN.

ROTARY CUTTER-HEAD.

SPECIFICATION forming part of Letters Patent No. 520,046, dated May 22, 1894.

Application filed January 28, 1893. Serial No. 460,148. (No model.)

*To all whom it may concern:*

Be it known that I, GEORGE C. GOODYEAR, a citizen of the United States, residing in the city of Flint, Genesee county, and State of Michigan, have invented a new and useful improvement in cutter-heads and knives to be used on shapers, stickers, or wherever a rotary cutter can be used for cutting moldings on the edge or face of a piece of wood of any shape or planing flat surfaces on shaper or sticker work, of which the following is a specification.

My invention relates to improvements in rotary cutter heads; and it has for one of its objects to provide a cutter head embodying a simple and efficient construction whereby the cutters may be readily placed and securely fixed in position and as readily removed when desired.

Another object of the invention is to provide a cutter head in which the cutters are so connected to the arbor that their heel ends will rest closer to the arbor than their cutting ends in order to afford clearance to that portion of the peripheral edges of the cutters back of the cutting edges without the necessity of filing or grinding said peripheral edges.

Other objects and advantages of the invention will be fully understood from the following description and claims when taken in connection with the annexed drawings, in which—

Figure 1, is a diametrical section of a rotary cutter-head embodying my invention. Fig. 2, is a transverse section of the same taken in the plane indicated by the line $x, x$, of Fig. 1. Fig. 3, is a detail view of one of the cutter holding collars, and Fig. 4, is a view illustrative of the manner of forming a number of cutters from a single circular blank.

Referring by letters and figures to said drawings:—D, indicates the arbor of my improved cutter head which is provided with a peripheral flange or collar G, and is threaded for a portion of its length as shown at $a$; and A, B, indicate the removable cutters. These cutters A, B, are preferably formed by cutting an annular blank on the lines indicated by J, K, in Fig. 4, so that there will be but a small amount of waste, and they have their forward edge inclined downwardly as shown at $b$. The said cutters A, B, are also provided upon their inner sides with dovetail projections $d$; and these dove tail projections are designed to be engaged by the securing collars C, as shown. These collars C, are provided in their peripheral edges at diametrically opposite points with shoulders L, and have the said peripheral edges tapered from the point of one shoulder to the heel of the other whereby it will be seen that when the cutters are in position as shown in Fig. 2, their heel ends will be nearer the arbor than their cutting ends and consequently clearance will be afforded to that portion of the peripheral edges of the cutters back of the cutting edges, without the necessity of grinding or filing said peripheral edges. The said collars C, are also provided in their inner sides (see Fig. 3,) with recesses $e$, the inner walls of which are beveled or inclined as shown so as to conform to and receive the dovetail projections of the cutters. By this construction it will be seen that when the collars are arranged on opposite sides of the cutters and secured in position, as shown in Fig. 1, the cutters will be securely held against casual movement or displacement in any direction. On the other hand it will be perceived that when it is desired to remove a cutter to be sharpened or for any other purpose, it is simply necessary to move one of the collars away from the cutters when they may be readily taken from the head.

In the practice of my invention, I prefer to secure the collars in engagement with the cutters by the nut E, through the medium of the interposed sleeve or false nut F, but I do not desire to be understood as confining myself to such manner of securing the collars as they may be secured in any approved manner. I prefer however to employ the construction illustrated inasmuch as the sleeve or false nut F, may be removed to give place to additional cutters and collars when more than one pair of each are to be employed in the head.

In order that the cutters may be easily driven through the stock without tearing or splitting the same, I prefer to adapt one cutter to cut one half of the work and the other cutter to cut the other half, that is to say, I provide depressions in the face of one cutter in alignment with the raised portions of the other. For example, I provide one cutter (see Fig. 1,) with raised portions 1, and 3, and depressions 2, and 4, and the other cutter with depressions 1, and 3, and raised portions 2, and 4.

It will be seen from the foregoing description taken in conjunction with the drawings that my improved cutter head is very simple and cheap and that by reason of the peculiar construction, the cutter heads may be readily removed and replaced when desired. It will also be seen that the collars C, serve in addition to holding the cutters, to give clearance to the cutter back of the cutting edge.

Having described my invention, what I claim is—

1. In a rotary cutter head, the combination of the cutters A, B, having dovetail projections on their inner sides, and collars C, provided in their sides with recesses having their inner walls beveled or inclined to engage the dovetail projections of the cutters and also provided on their peripheries with shoulders L, and having the said peripheries tapered from the point of one shoulder to the heel of the other, substantially as and for the purpose specified.

2. In a rotary cutter, the combination of an arbor, the cutters A, B, and collars arranged upon the arbor and disposed on opposite sides of the cutters; the said collars having shoulders L, at diametrically opposite points and also having their peripheral edges tapered from the point of one shoulder to the heel of the other, substantially as and for the purpose set forth.

3. The herein described rotary cutter head comprising the arbor having a collar G, and also having threads as $a$, the segmental cutters A, B, having the longitudinally-extending dovetail projections $d$, on their inner sides adapted to bear upon the arbor, collars C, disposed on opposite sides of the cutters and provided in their inner sides with recesses having their inner walls beveled to engage the dovetail projections of the cutters and a nut adapted to serve in conjunction with the collar G, to hold the collars C, in engagement with the cutters, substantially as specified.

GEORGE C. GOODYEAR.

Witnesses:
CHAS. S. BROWN,
J. H. RANKIN.